(No Model.)
C. S. TAINTER.
MOUNTING FOR DIAPHRAGMS FOR ACOUSTICAL INSTRUMENTS.
No. 392,763. Patented Nov. 13, 1888.
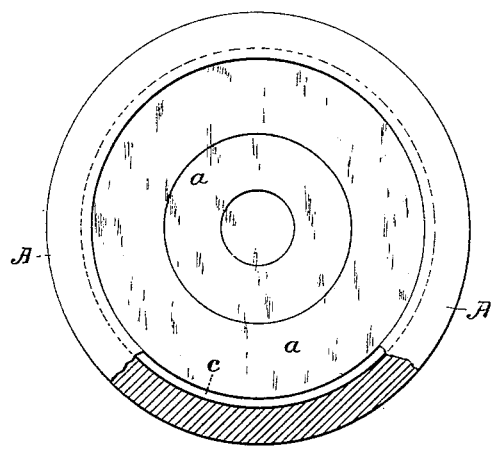
FIG. I.
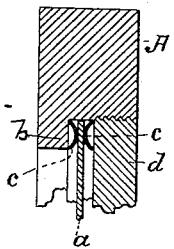
FIG. III.
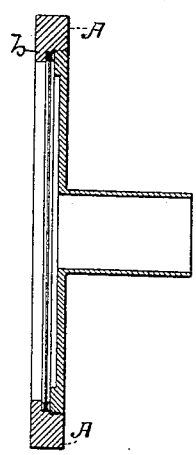
FIG. II.
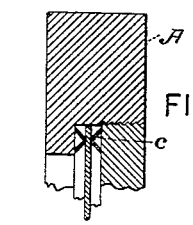
FIG. V.
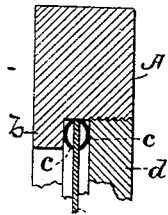
FIG. IV.
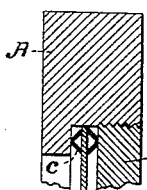
FIG. VI.
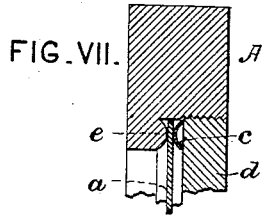
FIG. VII.
Attest:
Geo. T. Smallwood.
Philip Mauro.
Inventor:
Charles Sumner Tainter, by
A. Pollok
his attorney.

ered by a ring, A, which may be part of the frame of a telephone transmitter or receiver, or of a graphophone recorder or reproducer, pro-

UNITED STATES PATENT OFFICE.

CHARLES SUMNER TAINTER, OF WASHINGTON, DISTRICT OF COLUMBIA.

MOUNTING FOR DIAPHRAGMS FOR ACOUSTICAL INSTRUMENTS.

SPECIFICATION forming part of Letters Patent No. 392,763, dated November 13, 1888.

Application filed May 31, 1888. Serial No. 275,553. (No model.)

*To all whom it may concern:*

Be it known that I, CHARLES SUMNER TAINTER, of Washington, in the District of Columbia, have invented a new and useful Improvement in Mountings for Diaphragms of Graphophones, Telephones, &c., which is fully set forth in the following specification.

This invention relates to the mode of mounting the diaphragm of a graphophone, telephone, or other apparatus employing a vibratory diaphragm adapted either to respond to or to set up sonorous atmospheric vibrations, the diaphragm being of metal, mica, or other suitable material.

In the use of apparatus of this character it is found that if the diaphragm be not supported in a perfectly even plane—that is to say, if it be in the least bent or buckled—its amplitude of vibration is interfered with, and the operation of the instrument to some degree impaired. To avoid such difficulty, it has been found desirable that the devices between which the diaphragm is clamped at its edges should have a very narrow bearing surface or edge in contact with the diaphragm, and should be slightly elastic, so as to insure a continuous contact with the diaphragm, notwithstanding any slight difference in thickness in different parts of the latter.

To this end the diaphragm, according to the present invention, is clamped between two thin metal washers, grooved or struck up, so as to present a bearing-edge for contact with the diaphragm, the shape of the washers giving them the slight elasticity requisite for the purposes of the invention. The form of the washers in cross-section may be angular, or that of a segment of a circle, or other convenient shape. While it is preferred to use such a washer on each side of the diaphragm, a single washer may be used with good effect.

The accompanying drawings illustrate several ways of carrying out the invention, Figure I being a plan view, Fig. II a section, and Figs. III to VII sectional details on a larger scale.

The diaphragm *a* is shown as supported by a ring, A, which may be part of the frame of a telephone transmitter or receiver, or of a graphophone recorder or reproducer, provided with an internal shoulder, *b*. One of the metal washers *c* rests upon this shoulder. The diaphragm *a* is placed upon the washer, and a second washer, *c*, laid upon it, and the cap *d* screwed down tight, securely clamping the parts in place.

In Figs. II and III the washers *c* are of concavo-convex form, and they are arranged with their convex sides in contact with the diaphragm. Washers of this form may, as shown in Fig. IV, be arranged with their concave sides toward the diaphragm.

The washers may, as shown in Figs. V and VI, be V-shaped or angular in cross-section, and they may be placed with reference to the diaphragm in the position shown in either of these figures.

As shown in Fig. VII, the diaphragm *a* may have an elastic washer, *c*, on one side only, and such construction would be within the invention. As shown in this figure, the shoulder *b* on ring A is provided with a bead or rib, *e*, corresponding in shape and diameter with washer *c*. The bead could of course be on the cap *d*.

In all cases it is desirable that the bearing-edges of the two washers should be exactly opposite each other, and to that end they should be of the same diameter, and preferably of such diameter as to fit accurately inside the supporting-ring A, whereby they are properly centered. The washers *c* are conveniently made from a sheet of metal, being punched out and struck up at one operation.

It will of course be understood that if the diaphragm be used in a graphophone it is connected with the recording or reproducing style, or, if in a telephone, is combined with the operating parts thereof in the manner well known to those skilled in such arts.

I claim—

1. The combination, with a vibratory diaphragm, of a grooved or struck-up metal washer in contact with said diaphragm at its edge, and supporting and clamping devices, substantially as described.

2. The combination, with a vibratory diaphragm, of two grooved or struck-up metal washers, one on each side of said diaphragm, said washers being turned in opposite directions, so that corresponding sides thereof are in contact with said diaphragm, substantially as described.

3. The combination, with a vibratory diaphragm, of two metal washers of concavo-convex form, one on each side of said diaphragm, and clamping devices, substantially as described.

In testimony whereof I have signed this specification in the presence of two subscribing witnesses.

CHARLES SUMNER TAINTER.

Witnesses:
PHILIP MAURO,
C. J. HEDRICK.